US012165610B2

(12) United States Patent
Kwon et al.

(10) Patent No.: US 12,165,610 B2

(45) Date of Patent: Dec. 10, 2024

(54) METHOD OF OPERATING DISPLAY DRIVER INTEGRATED CIRCUIT, POWER MANAGEMENT INTEGRATED CIRCUIT AND ELECTRONIC DEVICE INCLUDING THE SAME, AND METHOD OF OPERATING THE SAME

(71) Applicant: SAMSUNG ELECTRONICS CO., LTD., Suwon-si (KR)

(72) Inventors: Kyounghwan Kwon, Suwon-si (KR); Wonseok Kim, Suwon-si (KR); Wangsuk Sung, Suwon-si (KR); Sangmin Lee, Suwon-si (KR); Seonmee Lee, Suwon-si (KR); Woonyoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/097,948

(22) Filed: Jan. 17, 2023

(65) Prior Publication Data

US 2023/0326425 A1 Oct. 12, 2023

(30) Foreign Application Priority Data

Apr. 12, 2022 (KR) ........................ 10-2022-0045290
Jul. 26, 2022 (KR) ........................ 10-2022-0092243

(51) Int. Cl.
*G06F 3/038* (2013.01)
*G09G 5/00* (2006.01)

(52) U.S. Cl.
CPC ..... *G09G 5/003* (2013.01); *G09G 2310/0243* (2013.01)

(58) Field of Classification Search
CPC ....................... G09G 5/003; G09G 2310/0243
USPC .......................................................... 345/212
See application file for complete search history.

(56) References Cited

U.S. PATENT DOCUMENTS

| | | | |
|---|---|---|---|
| 9,690,159 B2 | 6/2017 | Yamaki et al. | |
| 9,696,883 B2 | 7/2017 | Oh et al. | |
| 10,497,330 B2 | 12/2019 | Takahashi et al. | |
| 11,069,767 B2 | 7/2021 | Cheon et al. | |
| 11,250,762 B2 | 2/2022 | Nam et al. | |
| 2009/0184580 A1* | 7/2009 | Miyazaki | H02M 1/36 307/18 |
| 2011/0248688 A1* | 10/2011 | Iacob | G05F 1/56 323/234 |

(Continued)

FOREIGN PATENT DOCUMENTS

| | | |
|---|---|---|
| KR | 10-0893854 B1 | 4/2009 |
| KR | 10-2015-0022295 A | 3/2015 |

(Continued)

*Primary Examiner* — Jonathan M Blancha
(74) *Attorney, Agent, or Firm* — Sughrue Mion, PLLC

(57) ABSTRACT

An operating method of a display driver integrated circuit (DDI) includes determining whether a change to a level of a first logic voltage supplied to a logic circuit of the DDI is required, based on determining that a change to the level of the first logic voltage is required, transmitting a logic voltage setting command to a power management integrated circuit (PMIC), and receiving, from the PMIC, a second logic voltage having a level different from the first logic voltage and corresponding to the logic voltage setting command.

15 Claims, 12 Drawing Sheets

(56) References Cited

U.S. PATENT DOCUMENTS

| | | | | |
|---|---|---|---|---|
| 2015/0033047 | A1* | 1/2015 | Byun | G09G 5/36<br>713/320 |
| 2015/0054801 | A1 | 2/2015 | Seo et al. | |
| 2020/0004699 | A1* | 1/2020 | Mishra | G06F 13/4282 |
| 2020/0112654 | A1* | 4/2020 | Saito | H04N 5/202 |
| 2020/0243008 | A1 | 7/2020 | Lee et al. | |
| 2020/0279588 | A1* | 9/2020 | Lym | G11C 29/021 |
| 2021/0350763 | A1* | 11/2021 | Okamura | G06F 3/0412 |
| 2022/0197367 | A1* | 6/2022 | Kirubakaran | G06F 1/3287 |

FOREIGN PATENT DOCUMENTS

| | | | |
|---|---|---|---|
| KR | 10-2019-0023632 | A | 3/2019 |
| KR | 10-2148489 | B1 | 10/2020 |

* cited by examiner

METHOD OF OPERATING DISPLAY DRIVER INTEGRATED CIRCUIT, POWER MANAGEMENT INTEGRATED CIRCUIT AND ELECTRONIC DEVICE INCLUDING THE SAME, AND METHOD OF OPERATING THE SAME

CROSS-REFERENCE TO RELATED APPLICATION(S)

This application is based on and claims priority to Korean Patent Application No. 10-2022-0092243, filed on Jul. 26, 2022, and Korean Patent Application No. 10-2022-0045290, filed on Apr. 12, 2022, in the Korean Intellectual Property Office, the disclosures of which are incorporated herein by reference in their entireties.

BACKGROUND

1. Field

Example embodiments of the disclosure relate to a method of operating a display driver integrated circuit (DDI), a power management integrated circuit (PMIC), and an electronic device including the same.

2. Description of Related Art

In general, a display device may include a display panel displaying an image, and a display driver integrated circuit driving the display panel, and a PMIC. The DDI may drive the display panel by receiving image data from an external host and applying an image signal corresponding to the received image data to a source line of the display panel. In order to reduce power consumption, the DDI and the PMIC vary, via S-wire communication, the analog power and the panel driving power of the DDI according to a panel driving mode.

SUMMARY

Provided are a method of operating a display driver integrated circuit (DDI) reducing new power consumption, a power management integrated circuit (PMIC), and an electronic device including the same.

Additional aspects will be set forth in part in the description which follows and, in part, will be apparent from the description, or may be learned by practice of the presented embodiments.

According to an aspect of an example embodiment, an operating method of a DDI may include determining whether a change to a level of a first logic voltage supplied to a logic circuit of the DDI is required, based on determining that a change to the level of the first logic voltage is required, transmitting a logic voltage setting command to a PMIC, and receiving, from the PMIC, a second logic voltage having a level different from the first logic voltage and corresponding to the logic voltage setting command.

According to an aspect of an example embodiment, a PMIC may include a first voltage generator configured to generate a first voltage supplied to a panel, and determine a level of the first voltage in response to a first control signal, a second voltage generator configured to generate a second voltage supplied to an analog circuit of a DDI, and determine a level of the second voltage in response to a second control signal, a third voltage generator configured to generate a third voltage supplied to the DDI, and determine a level of the third voltage in response to a third control signal, and a logic circuit configured to receive at least one power setting command via communication with the DDI, and generate the first control signal, the second control signal, and the third control signal.

According to an aspect of an example embodiment, an electronic device may include an application processor, a DDI driven by an analog voltage and a logic voltage and configured to receive a power control command from the application processor, and generate at least one power setting command, a panel configured to receive a panel voltage, and a PMIC configured to communicate with the DDI, and generate, in response to the at least one power setting command, the panel voltage, the analog voltage, and the logic voltage. A level of the logic voltage may be lowered from a first level to a second level lower than the first level during low-frequency driving.

According to an aspect of an example embodiment, an operating method of a DDI may include receiving, from an application processor, a power control command corresponding to voltage control, setting, in response to the power control command, a logic voltage control mode with respect to a PMIC setting register, determining whether an operation mode is a low-frequency operation mode, based on the operation mode being determined to be the low-frequency operation mode, transmitting, to a PMIC, a power setting command for lowering a logic voltage, and receiving, from the PMIC, a logic voltage corresponding to the power setting command.

According to an aspect of an example embodiment, a DDI may include a power management control register configured to receive a power control command from an application processor, and store power management control information corresponding to the power control command, an interface circuit configured to communicate with a PMIC based on the power management control information, and transmit, to the PMIC, a power setting command for changing a level of a logic voltage, and a regulator configured to receive the logic voltage from the PMIC. The level of the logic voltage may be determined based on the power setting command.

BRIEF DESCRIPTION OF DRAWINGS

The above and other aspects, features, and advantages of certain example embodiments of the present disclosure will be more apparent from the following description taken in conjunction with the accompanying drawings, in which.

DETAILED DESCRIPTION

Hereinafter, example embodiments will be described clearly and specifically such that a person skilled in the art easily could carry out example embodiments using the drawings.

Figure 1:
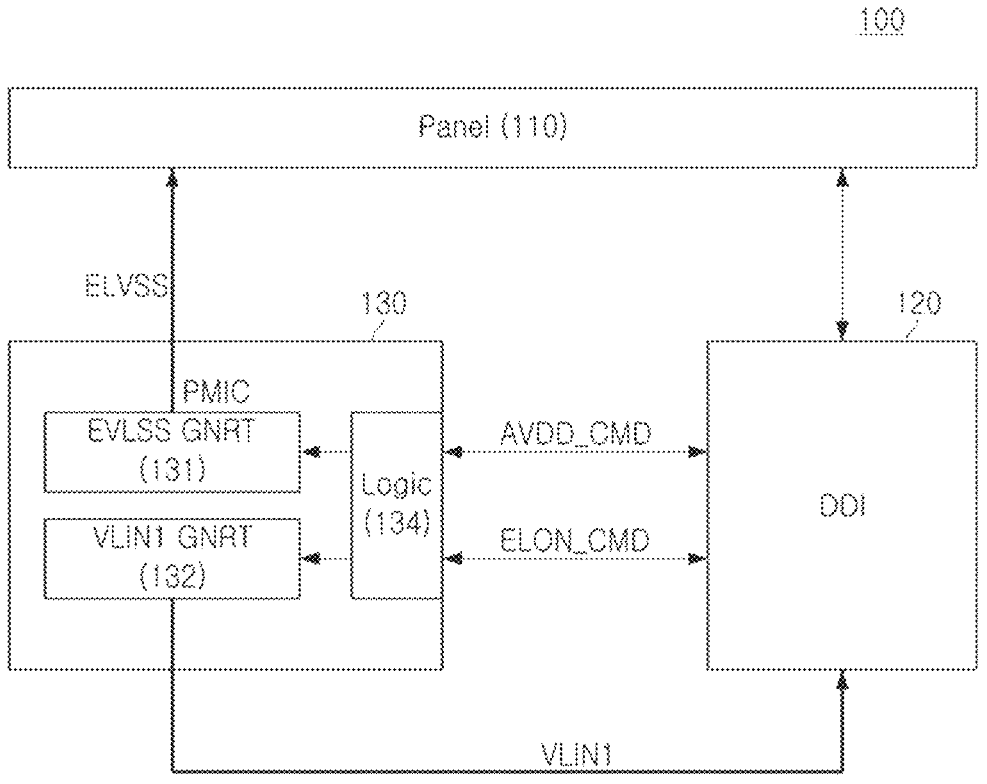
FIG. 1 is a diagram illustrating a general display device according to an example embodiment.

FIG. 1 is a diagram illustrating a general display device 100 according to an example embodiment. Referring to FIG. 1, a display device 100 may include a panel 110, a display driver integrated circuit (DDI) 120, and a power management integrated circuit (PMIC) 130.

The panel 110 may be implemented to display image data. In an example embodiment, the panel 110 may be implemented as a thin film transistor-liquid crystal display (TFT-LCD) panel, a light emitting diode (LED) display panel, an organic LED (OLED) panel, an active matrix OLED (AMO-LED) display panel, a flexible display panel, or the like. The panel 110 may include a plurality of pixels arranged in a matrix form having a plurality of rows and a plurality of columns. Each of the plurality of pixels may be connected to a plurality of data lines and a plurality of source lines. Here, in relation to designated color display, a pixel may include an RGB sub-pixel (e.g., a RGB stripe layout structure) or RGB sub-pixels (e.g., a pentile layout structure), as a structure in which sub-pixels such as red, green, and blue are arranged adjacent to each other. Alternatively, the pixel may be replaced with an RGB white (RGBW) sub-pixel arrangement structure.

The DDI 120 may be implemented to control an operation of the panel 110. For example, the DDI 120 may change data transmitted from a processor to have a form for transmission to the panel 110, and may transmit the changed data to the panel 100. In an example embodiment, the DDI 120 may control a state (a sleep state, a display-on state, a display-off state, or the like) of the panel 110.

The PMIC 130 may be implemented to manage voltages, such as the panel voltage ELVSS and the analog voltage VLIN1, necessary for the panel 110 and the DDI 120. The PMIC 130 may include a first voltage generator 131, a second voltage generator 132, and a logic circuit 134. The first voltage generator 131 may generate a panel voltage ELVSS (e.g., a "first voltage"). The second voltage generator 132 may generate an analog voltage VLIN1 (e.g., a "second voltage") necessary for driving the DDI 120. The logic circuit 134 may receive, from the DDI 120, power setting commands AVDD_CMD and ELON_CMD necessary for power management. The first voltage generator 131 may vary a level of the panel voltage ELVSS in response to the first power setting command AVDD_CMD. The second voltage generator 132 may vary a level of the analog voltage VLN1 in response to the second power setting command ELON_CMD.

Figure 2:
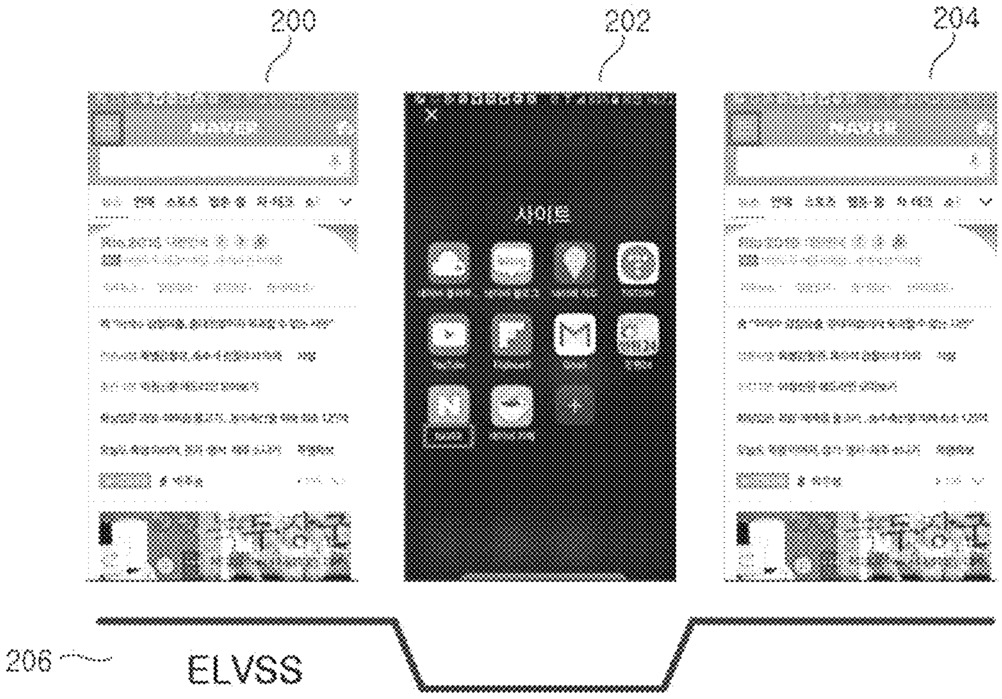
FIG. 2 is a diagram illustrating an example in which power reduction is implemented by changing a panel voltage depending on a screen content according to an example embodiment.

FIG. 2 is a diagram illustrating an example in which power reduction is implemented by changing a panel voltage ELVSS depending on a screen content according to an embodiment. As illustrated in FIG. 2, the panel voltage ELVSS in a low power mode may be set to be lower than that in a normal mode. For example, screen 200 shows a display device operating in a normal mode, screen 202 shows the display device operating in a low power mode, and screen 204 shows the display device operating in a normal mode (e.g., the low power mode may be a low brightness mode and a normal mode may be a normal brightness or high brightness mode). Graph 206 shows the panel voltage ELVSS variation that occurs when switching between the modes.

In general, among voltage sources of the OLED-oriented PMIC 130, the analog voltage VLIN1 and the panel voltage ELVSS may require ON/OFF or level control depending on a driving condition of the panel 110. Accordingly, the DDI 120 may have voltage control for the analog voltage VLIN1 and the panel voltage ELVSS. Conversely, the logic voltage VDDR of the DDI may require power even when the panel is in an OFF state. The voltage control of the logic voltage VDDR may be possessed by a connected application processor (AP).

In a general display device, a logic consumption current of the DDI may be low in a low-frequency driving section of a low temperature poly-silicon (LTPO) panel, and thus dynamic voltage scaling (DVS) for a voltage source may be possible. However, PMIC implementation may not be possible.

A display device according to an example embodiment may reduce a logic consumption current of a DDI via PMIC communication with the DDI in the LTPO panel.

Figure 3:
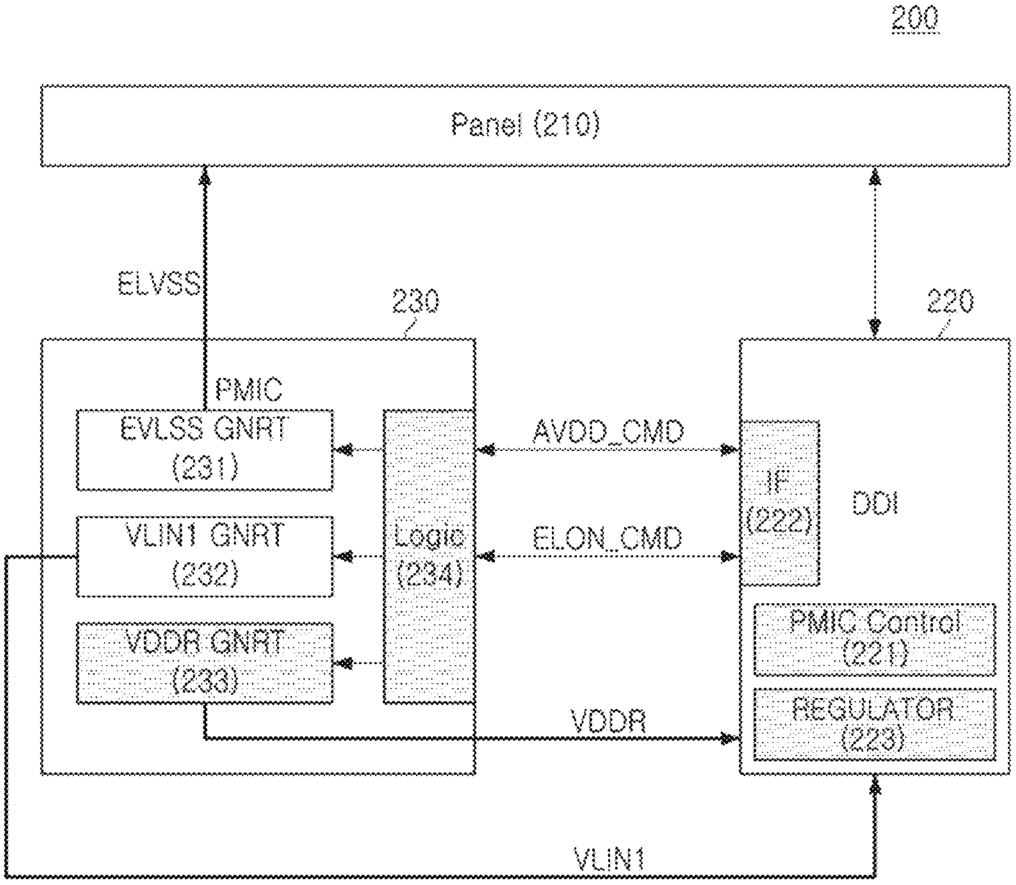
FIG. 3 is a diagram illustrating a display device according to an example embodiment.

FIG. 3 is a diagram illustrating a display device 200 according to an example embodiment. Referring to FIG. 3, the display device 200 may include a panel 210, a DDI 220, and a PMIC 230.

The DDI 220 may include a PMIC control register 221, an interface circuit (IF) 222, and a regulator 223.

The PMIC control register 222 may receive, from an AP, a power setting command related to voltage control of the PMIC 230, and may store power control management information corresponding to the power setting command.

The IF 222 may be implemented to communicate with the PMIC 230 via a communication interface. The communication interface may be an inter-integrated circuit (I2C) or S-wire communication interface. It should be understood that the communication interface is not limited thereto. In an example embodiment, the IF 222 may transmit, in response to a tearing effect (TE) signal, a power setting command to the PMIC 230. In an example embodiment, the IF 222 may determine the number of communications with the PMIC 230 using touch sensitive panel (TSP) information.

The regulator 223 may be implemented to receive, from the PMIC 230, the analog voltage VLIN1 or the logic voltage VDDR, and to output a target voltage level. The regulator 223 may include a low drop-out (LDO) regulator.

The DDI 220 may control the PMIC 230 using the power setting command. In an example embodiment, when the communication interface is the S-wire interface, the PMIC 230 may be controlled depending on the number of toggling. In another example embodiment, when the communication interface is the I2C interface, the PMIC 230 may be controlled depending on an address. The DDI 220 may not be equipped with a micro control unit (MCU), and thus it may be difficult to secure software (S/W) flexibility. However, when the I2C interface is used, a register address map related to the logic voltage VDDR control and a voltage control sequence may be standardized.

Although it is illustrated in FIG. 3 that one DDI 220 controls one PMIC 230, example embodiments are not limited thereto. A DDI according to example embodiments may control a plurality of PMICs.

The PMIC 230 may add a path for controlling the logic voltage VDDR from the DDI 220. In addition, simultaneous access to the PMIC 230 from the AP and the DDI 220 may be prevented by setting the AP and a protocol. In an example embodiment, the AP may change control of the logic voltage VDDR for the PMIC 230 by transmitting a special command to the DDI 220. For example, the control of the logic voltage VDDR in a normal mode may be possessed by the AP. However, the control of the logic voltage VDDR in a low-frequency operation mode may be possessed by the DDI 220.

The PMIC 230 may include a first voltage generator 231, a second voltage generator 232, a third voltage generator 233, and a logic circuit 234. The first voltage generator 231 may be implemented to generate the panel voltage ELVSS (e.g., a "first voltage") according to a first control signal of the logic circuit 234. The second voltage generator 232 may be implemented to generate the analog voltage VLIN1 (e.g., a "second voltage") according to a second control signal of the logic circuit 234. The third voltage generator 233 may be implemented to generate the logic voltage VDDR (e.g., a "third voltage") according to a third control signal of the logic circuit 234. The logic circuit 234 may be implemented to receive, from the DDI 220, commands AVDD_CMD and ELON_CMD, and to output the first control signal, the second control signal, and the third control signal.

FIGS. 4A, 4B, 4C, 4D and 4E are diagrams illustrating VDDR being dynamically changed during low-frequency driving in a display device according to an example embodiment.

Figure 4A:
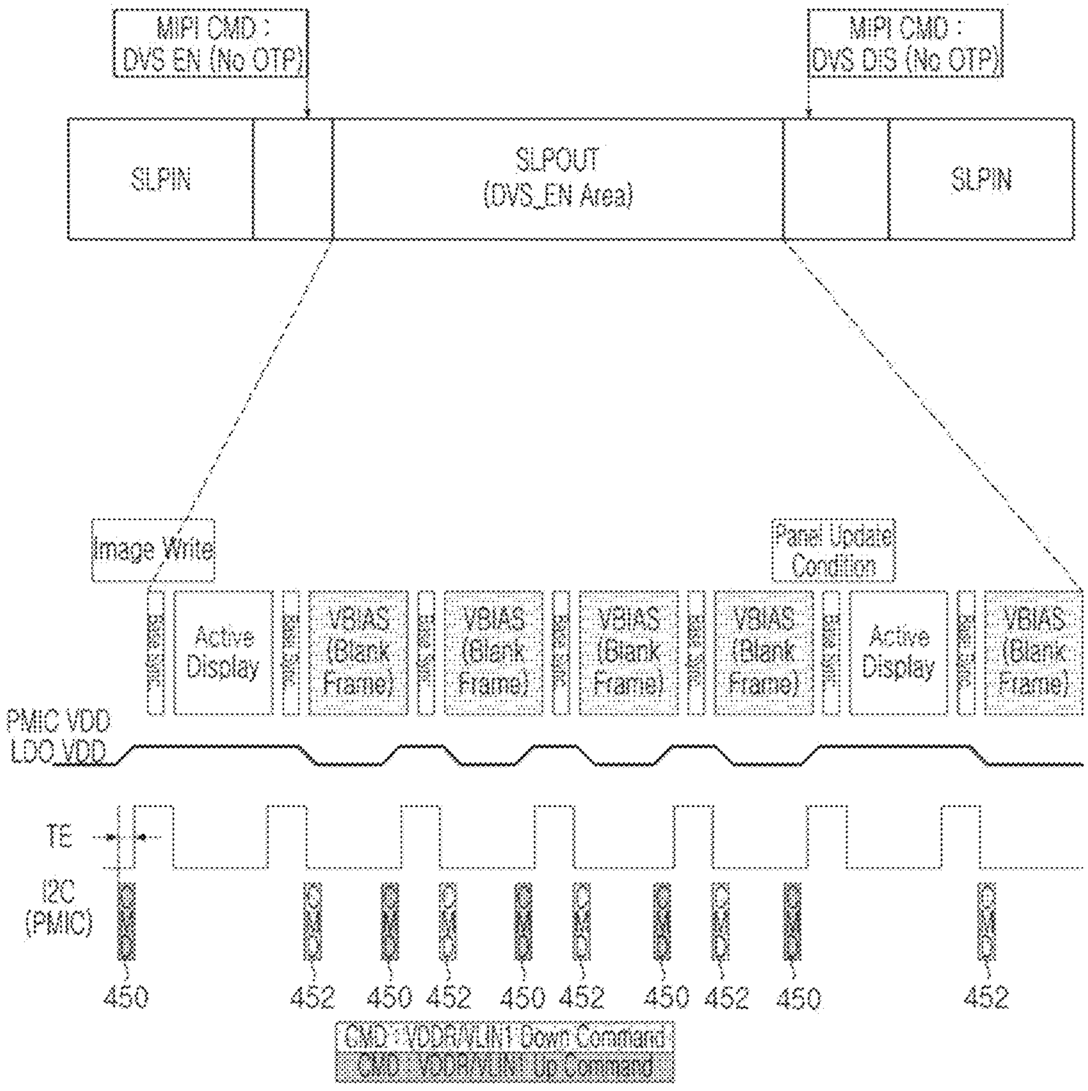
FIGS. 4A, 4B, 4C, 4D and 4E are diagrams illustrating a logic voltage being dynamically changed during low-frequency driving in a display device according to an example embodiment.

Referring to FIG. 4A, for ease of description, it is assumed that the DDI 220 controls a state entering a sleep mode (SLPIN) and a state outside of a sleep mode (SLPOUT). When the panel 210 is in a state outside of the sleep mode (SLPOUT), DVS may be enabled. Before being in the state outside of the sleep mode (SLPOUT), an AP may assign, by a mobile industry processor interface (MIPI), command, voltage control for enabling a DVS function (DVS EN) to the DDI 220. Thereafter, before entering the sleep mode, the AP may recover, by the MIPI command, voltage control for disabling a DVS function (DVS DIV) from the DDI 220.

Figure 4B:
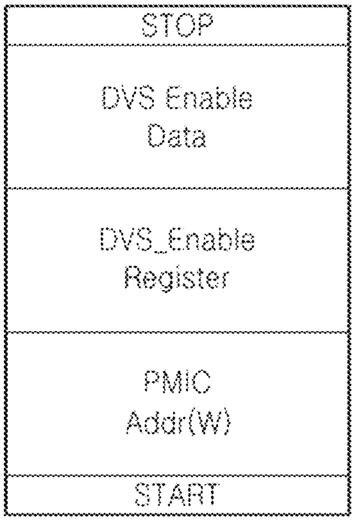
Figure 4C:
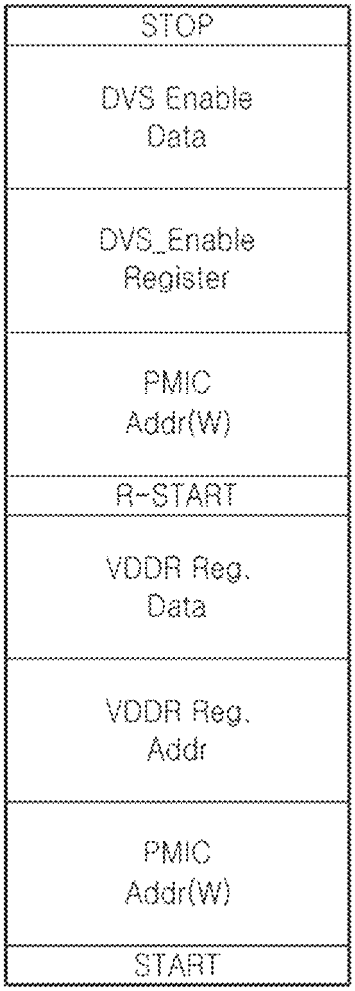

FIG. 4B is a diagram illustrating a DVS enabling command received from an AP, and FIG. 4C is a diagram illustrating a DVS disabling command received from the AP. Referring to FIG. 4B, the DVS enabling command may include a start bit, a PMIC address, a DVS enabling register address, DVS enabling data, and an end bit. Referring to FIG. 4C, the DVS disabling command may include a start bit, a PMIC address, a VDDR register address, VDDR register data, an R-start bit, a DVS enabling register address, DVS disabling data, and an end bit.

Referring back to FIG. 4A, when an image is written on the panel 210, a state outside of the sleep mode (SLPOUT), that is, a DVS enabling region may be secured. For example, when an image is written on the panel 210, an active display section may exist after a base synchronization (base sync) section. Thereafter, the DDI 220 may perform a DVS operation in response to a TE signal until a new image is updated on the panel 210. The TE signal may be a signal for informing the AP that an update is available. Since it is before the update is performed, a VBIAS section corresponding to a blank frame may be repeated. Thus, PMIC power (PMIC VDD) and LDO power (LDO VDD) may toggle, in response to the TE signal, a rising level and a falling level. Power setting commands for such power toggling may be periodically transmitted to the PMIC 230 via the I2C interface.

As illustrated in FIG. 4A, before the TE signal rises to a high level, a first power setting command may be transmitted to the PMIC 230. The first power setting command may be a command for commanding a rise in a voltage level of VDDR/VLIN1. In addition, as illustrated in FIG. 4A, after the TE signal falls to a low level, a second power setting command may be transmitted to the PMIC 230. The second power setting command may be a command for commanding a fall in the voltage level of the VDDR/VLIN1.

Figure 4D:
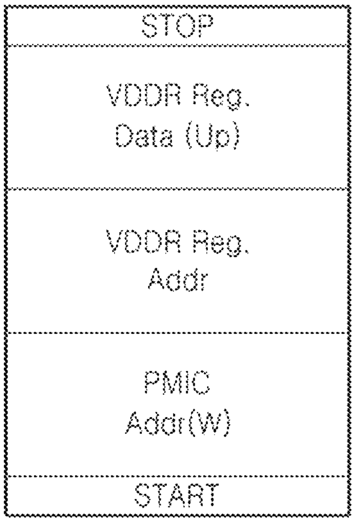
Figure 4E:
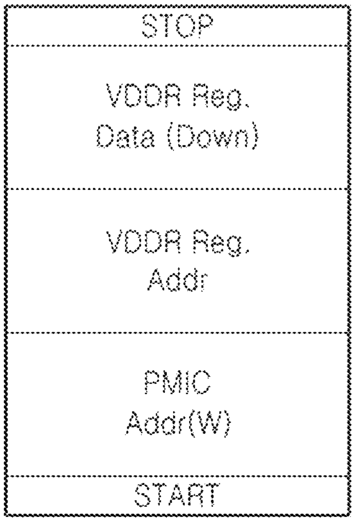

FIG. 4D is a diagram illustrating a first power setting command, and FIG. 4E is a diagram illustrating a second power setting command. Referring to FIG. 4D, the first power setting command may include a start bit, a PMIC address, a VDDR register address, VDDR register data, and an end bit. The VDDR register data may include information for raising a voltage level of VDDR. Referring to FIG. 4E, the second power setting command may include a start bit, a PMIC address, a VDDR register address, VDDR register data, and an end bit. The VDDR register data may include information for lowering the voltage level of the VDDR. In an example embodiment, a time point of transmitting the first and second power setting commands may be determined in consideration of internal power stabilization time and I2C command time.

In summary, referring to FIGS. 4A to 4E, the DDI 220 may dynamically change the logic voltage VDDR by communicating with the PMIC 230 during low-frequency driving. For example, during low-frequency driving, the logic voltage VDDR may be changed from about 1.8V to about 1.3V. Accordingly, the DDI 220 may reduce logic power.

In FIG. 4A, a power setting command CMD may be transmitted via the I2C interface. However, example embodiments are not limited thereto. The power setting command CMD may be transmitted via an S-wire interface. The CMDs may include VDDR/VLIN1 down commands 450 and VDDR VLIN1 up commands 452.

The DDI 220 may not verify a point in time at which an application of the AP needs to update an image, such as a touch event. Thus, a TE may be a signal for periodically informing the AP of a point in time at which a video update is available. The logic voltage VDDR may need to be changed from about 1.3V to about 1.8V in advance by communicating with the PMIC 230 before TE enabling. When there is no image update, the logic voltage VDDR may need to be changed back from about 1.8V to about 1.3 V after TE disabling.

The DDI 220 may need to determine a time point of communicating with the PMIC 230 in consideration of power stabilization time of the PMIC 230 and a timing of communication with the PMIC 230. For example, the DDI 220 may determine a communication time point using a control register.

Figure 5:
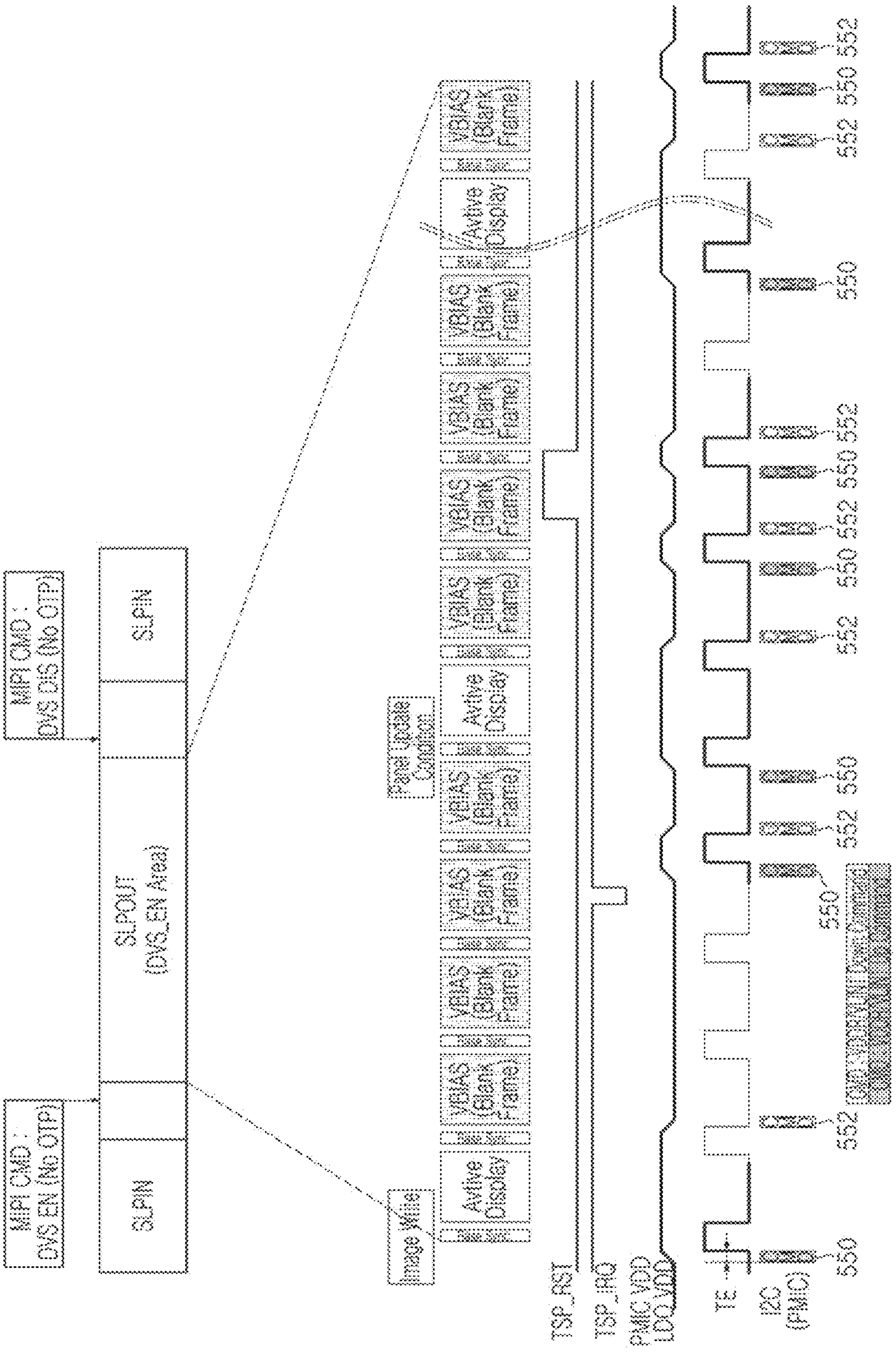
FIG. 5 is a diagram illustrating a logic voltage being dynamically changed during low-frequency driving in a display device according to an example embodiment.

FIG. 5 is a diagram illustrating a display device dynamically changing a logic voltage VDDR during low-frequency driving according to an example embodiment. In FIG. 5, a power setting command CMD may be transmitted via the I2C interface. However, example embodiments are not limited thereto. The power setting command CMD may be transmitted via an S-wire interface. The CMDs may include VDDR/VLIN1 down commands 550 and VDDR VLIN1 up commands 552.

Referring to FIG. 5, a DDI 220 may reduce the number of communications with the PMIC 230 using TSP information TSP_INFO related to a touch event and a communication channel, thereby reducing additional logic power. For example, the DDI 220 may adjust a TE enabling cycle via a protocol with an AP. The DDI 220 may not need to communicate with the PMIC 230 in a section in which there is no TE enabling. Thus, the DDI 220 may additionally secure holding time in a low power supply voltage (1.3V) state. As illustrated in FIG. 5, a TE signal may be enabled from when a touch event interrupt signal TSP_IRQ is received until a touch event reset signal TSP_RST is received.

Figure 6:
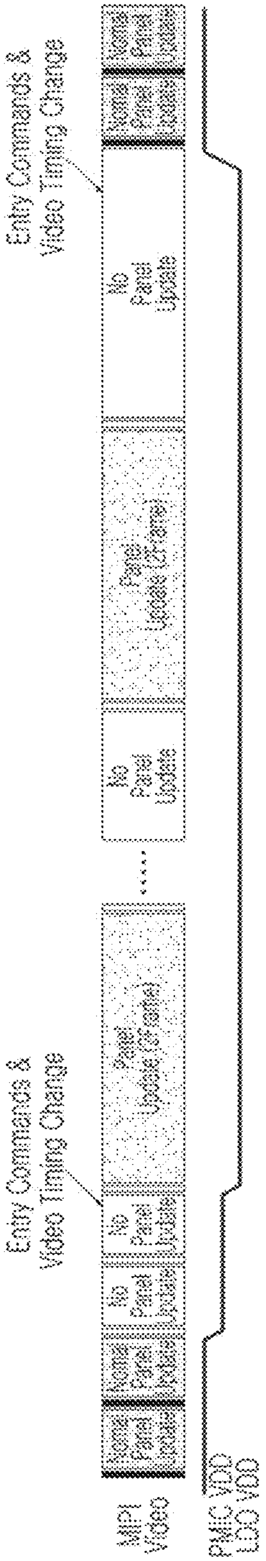
FIG. 6 is a diagram illustrating a reduction in additional power consumption of a display device according to an example embodiment.

FIG. 6 is a diagram illustrating a reduction in additional power consumption in a display device according to an example embodiment.

A point in time at which memory data of the DDI 220 is charged to the capacitor of the panel 210 without transmitting new image data from the AP may be determined by the DDI 220 by itself. Accordingly, DVS may be applicable.

In a display device 200 according to an example embodiment, when a low-power display is driven, image quality improvement and panel compensation IPs positioned in the DDI 220 may not operate. Accordingly, additional logic power may be reduced, as illustrated in FIG. 6. In addition, DVS may be applied to a power supply voltage of an LDO regulator in the DDI 220, in addition to a reduction in a power supply voltage of the PMIC 230. Thus, additional logic power may be reduced.

Figure 7:
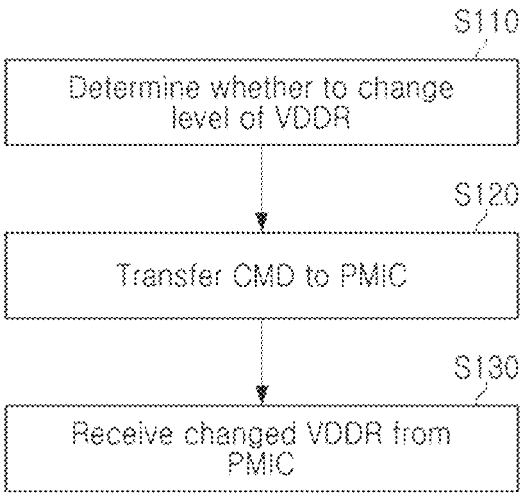
FIG. 7 is a flowchart illustrating a method of operating a display driver integrated circuit (DDI) according to an example embodiment.

FIG. 7 is a flowchart illustrating a method of operating a DDI. Referring to FIG. 7, the method of operating the DDI may be performed as follows.

In operation S110, the DDI 220 may determine a level change of the logic voltage VDDR. In operation S120, the DDI 220 may transmit a power setting command to the PMIC 230. In operation S130, the DDI 220 may receive the changed logic voltage VDDR from the PMIC 230.

In an example embodiment, the DDI 220 may determine whether to change a level of the analog voltage VLIN1 supplied to an analog circuit, and may transmit a corresponding analog voltage setting command to the PMIC 230 when a level change of the analog voltage is required.

In an example embodiment, the DDI 220 may receive, from an AP, a power control command corresponding to voltage control for the PMIC 230. In an example embodiment, the DDI 220 may determine to raise a level of the logic voltage VDDR before a TE signal for informing a point in time at which an image update is available is enabled. In an example embodiment, the DDI 220 may determine to lower the level of the logic voltage VDDR after the TE signal is disabled. The TE signal may be periodically output to the AP.

In an example embodiment, the DDI 220 may determine a time point of transmitting a logic voltage setting command to the PMIC 230 in consideration of power stabilization time of the PMIC 230 and a timing of communication with the PMIC 230. In an example embodiment, the DDI 220 may reduce the number of communications with the PMIC 230 using TSP information. In an example embodiment, the level of the logic voltage VDDR may have a first level and a second level. The second level may be lower than the first level. In an example embodiment, the level of the logic voltage VDDR may be maintained at the second level in a section in which there is no TE signal. In an example embodiment, when a low-power display is driven, a power supply voltage of an LDO may fall to a third level lower than the second level.

Figure 8:
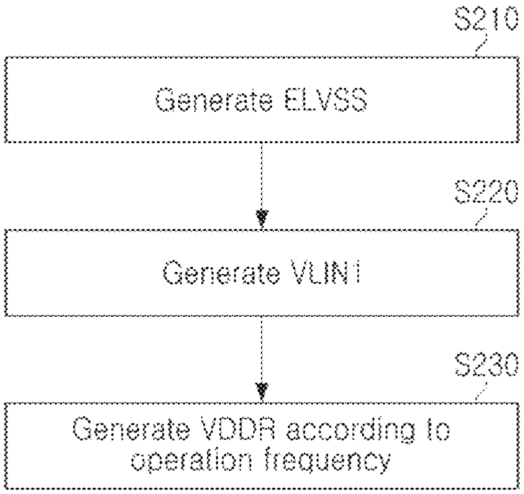
FIG. 8 is a flowchart illustrating a method of operating a power management integrated circuit (PMIC) according to an example embodiment.

FIG. 8 is a flowchart illustrating a method of operating a PMIC according to an example embodiment. Referring to FIG. 8, the method of operating the PMIC may be performed as follows.

In operation S210, the PMIC 230 may generate the panel voltage ELVSS. In operation S220, the PMIC 230 may generate the analog voltage VLIN1. In operation S230, PMIC 230 may generate the logic voltage VDDR according to an operating frequency. A level of the logic voltage VDDR may vary according to the operating frequency. For example, the level of the logic voltage VDDR when the operating frequency is a low frequency may be lower than that when the operating frequency is a high frequency.

Figure 9:
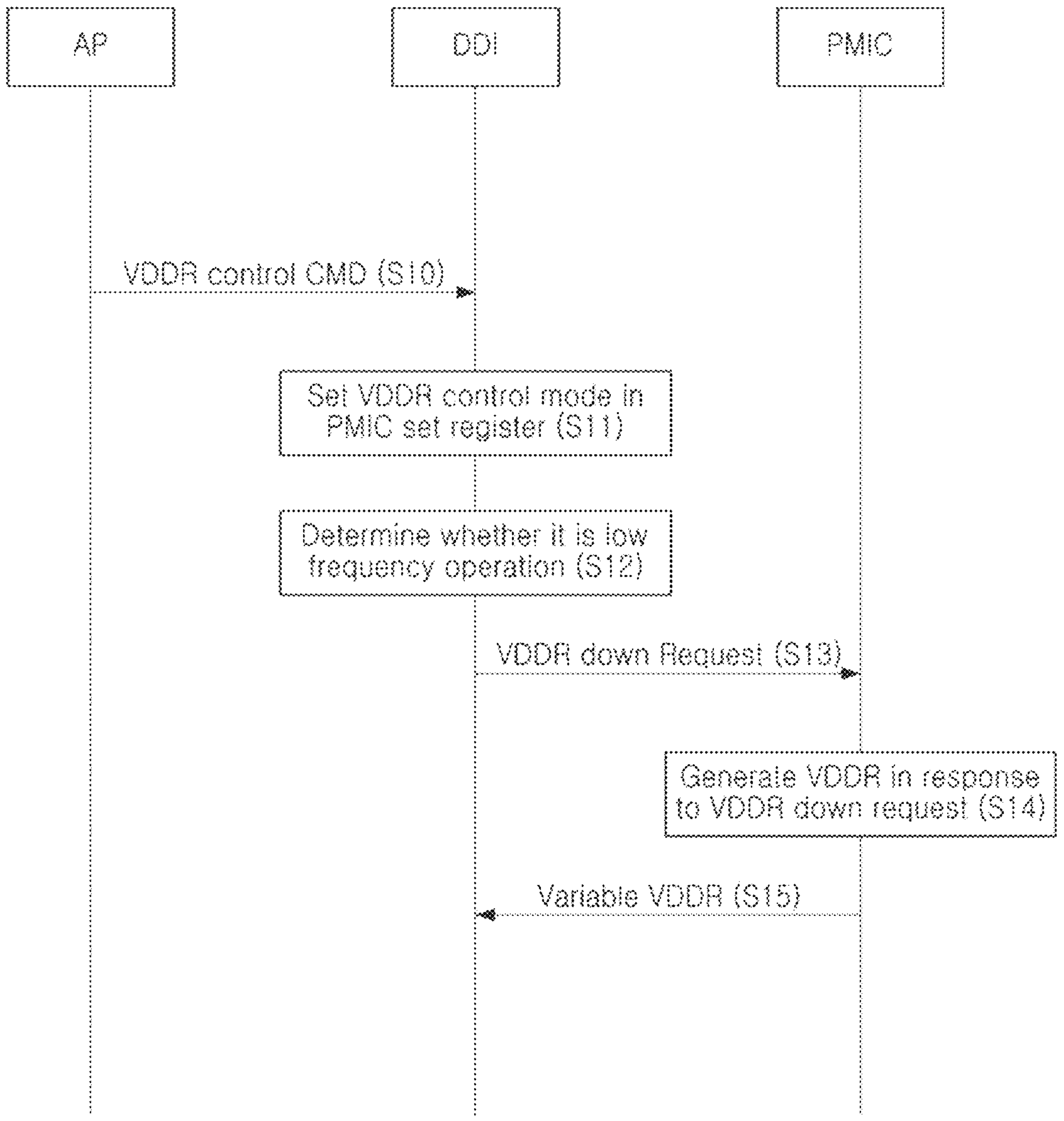
FIG. 9 is a diagram illustrating a power management method performed by a display system according to an example embodiment.

FIG. 9 is a diagram illustrating a power management method performed by a display system according to an example embodiment. Referring to FIG. 9, the power management method performed by the display device 200 may be performed as follows.

In operation S10, an AP may transmit, to a DDI, a command related to control of the logic voltage VDDR. In an example embodiment, DVS may be enabled or disabled in response to a power control command. In an example embodiment, the DDI may receive, from the AP, a power control command for enabling DVS when a state of a panel is outside of a sleep mode. In an example embodiment, when the state of the panel enters the sleep mode, the DDI may receive, from the AP, a power control command for disabling DVS. The DDI may set a control mode of the logic voltage VDDR according to the received command. In operation S11, a value indicating a set control mode may be stored in a PMIC setting register. In operation S12, the DDI may determine whether an operating frequency is a low frequency. As a result of the determination, in operation S13, when the operating frequency is the low frequency, the DDI may transmit, to a PMIC, a logic voltage VDDR down request. In operation 514, the PMIC may generate the logic voltage VDDR in response to the logic voltage VDDR down request. In operation 515, the PMIC may apply the changed logic voltage VDDR to the DDI.

In an example embodiment, the DDI may include transmitting a first power setting command to the PMIC at a point in time at which a TE signal rises, and transmitting a second power setting command to the PMIC at a point in time at which the TE signal falls. The first power setting command may be a command for commanding a rise in the logic voltage VDDR, and the second power setting command may be a command for commanding a fall in the logic voltage VDDR.

Figure 10:
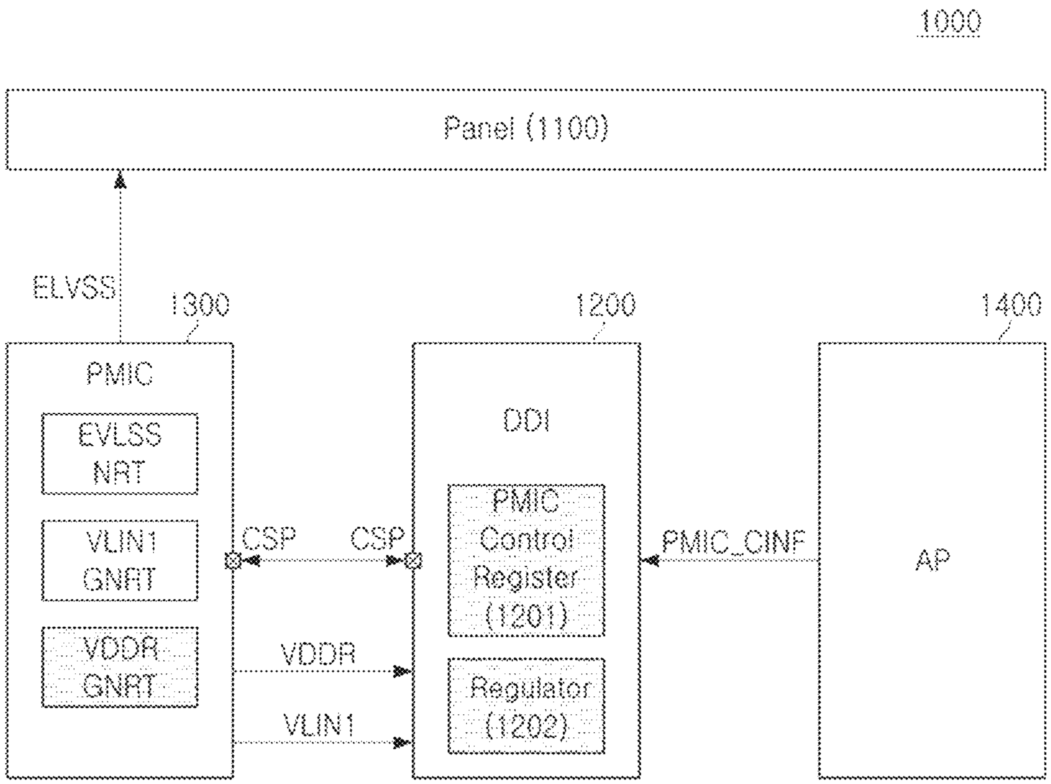
FIG. 10 is a diagram illustrating an electronic device according to an example embodiment.

FIG. 10 is a diagram illustrating an electronic device according to an example embodiment. Referring to FIG. 10, an electronic device 1000 may include a panel 1100, a DDI 1200, a PMIC 1300, and an AP 1400.

The AP 1400 may transmit, to the DDI 1200, power management control information PMIC_CINF.

The DDI 1200 may include a power management control register 1201 storing power management control information PMIC_CINF, and a regulator (e.g., an LDO regulator) 1202. The DDI 1200 may output a control signal to the PMIC 1300 via a control pin CSP, during low-frequency driving. The regulator 1202 may be implemented to DC/DC convert the analog voltage VLIN1 or the logic voltage VDDR received from the PMIC 1300.

The PMIC 1300 may receive the control signal via the control pin CSP, and may generate the corresponding panel voltage ELVSS, the analog voltage VLIN1, and the logic voltage VDDR.

Figure 11:
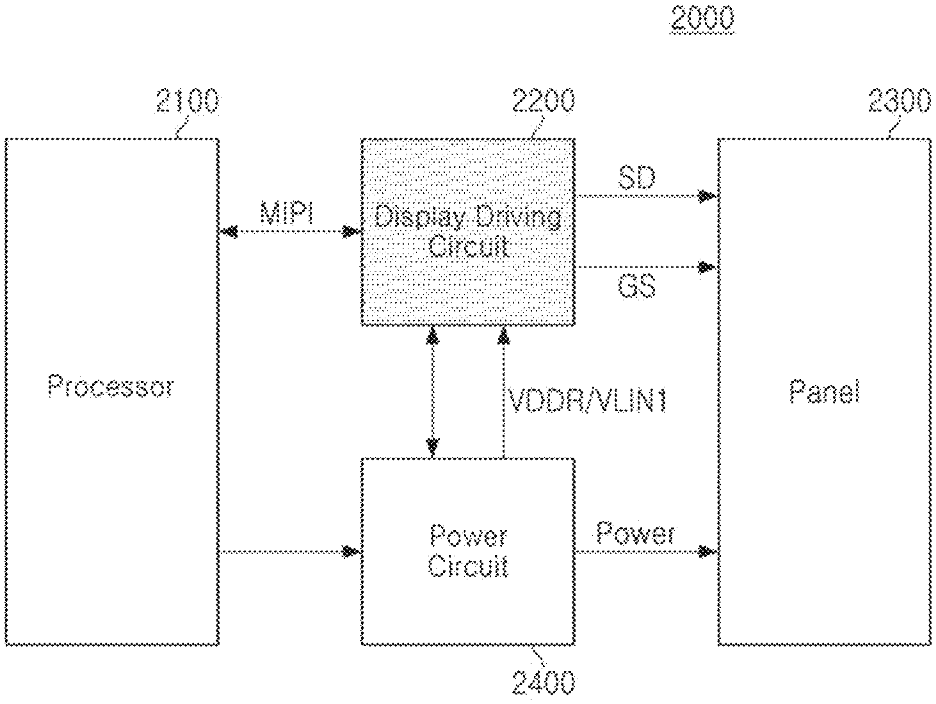
FIG. 11 is a diagram illustrating an electronic device according to an example embodiment.

FIG. 11 is a diagram illustrating an electronic device 2000 according to an example embodiment. Referring to FIG. 11, the electronic device 2000 may include a processor (e.g., an AP) 2100, a display driving circuit (e.g., a DDI) 2200, a panel 2300, and a power circuit (e.g., a PMIC) 2400.

The processor 2100 may be implemented to control an overall operation of a display device. In an example embodiment, the processor 2100 may be implemented as an integrated circuit, a system on a chip, or a mobile AP. The processor 2100 may transmit, to the display driving circuit 2200, data to be displayed (for example, image data, video data, or still image data). In an example embodiment, data may be classified in units of source data SD corresponding to a horizontal line (or vertical line) of a display panel 2300.

The display driving circuit 2200 may change the data transmitted from the processor 100 to have a form that is transmittable to the display panel 2300, and may transmit the changed data to the display panel 2300. The source data SD may be supplied in units of pixels.

In addition, the display driving circuit 2200 may control a level of the logic voltage VDDR by communicating with the power circuit 2400, as described with reference to FIGS. 1 to 10.

A processor interface may interface signals or data exchanged between the processor 2100 and the display driving circuit 2200. The processor interface may interface source data SD (line data) transmitted from the processor 2100 to transmit the interfaced source data SD to the display driving circuit 2200. In an example embodiment, the processor interface may be an interface related to a serial interface such as a MIPI, a mobile display digital interface (MDDI), a display port, or an embedded display port (eDP).

The display panel 2300 may display the source data SD by means of the display driving circuit 2200.

The power circuit 2400 may be implemented to manage power of the display device. In an example embodiment, the power circuit 2400 may include a PMIC, a charger IC, or a battery or fuel gauge. In addition, the power circuit 2400 may have a wired and/or wireless charging method. The wireless charging method may include, for example, a magnetic resonance method, a magnetic induction method or an electromagnetic wave method, and may further include an additional circuit for wireless charging, for example, a coil loop, a resonance circuit, a rectifier, or the like.

The power circuit 2400 may receive a command from the processor 2100 to supply power to each portion of the display device. The power circuit 2400 may supply power to each of the display driving circuit 2200 and the display panel 2300. For example, the power circuit 2400 may provide an external voltage EV to the display driving circuit 2200. The external voltage EV may be processed and used inside the display driving circuit 2200. A power interface may interface between the power circuit 2400 and the display driving circuit 2200. For example, the power interface may transmit commands transmitted by the display driving circuit 2200 to the power circuit 2400. The power interface may be implemented separately from the processor interface. The display driving circuit 2200 may be directly connected to the power circuit 2400 without going through the processor 2100.

In addition, the power circuit 2400 may receive a power setting command from the display driving circuit 2200 to control a level of power in each portion of the display device.

The display device according to an example embodiment may reduce logic power of a driver IC by performing PMIC communication with a with-ram driver IC in an LTPO application panel. The display device according to an example embodiment may add a mode of varying logic power VDDR, in addition to existing panel light emitting voltage ELVSS and IC analog power VLIN1, according to a mode (e.g., low-frequency driving, low-power watch driving) of the display IC. In addition, the display device according to an example embodiment may maximize the effect of reducing logic power by connecting a touch display IC and a touch event generation signal to each other.

Low-frequency driving may be possible according to the application of an LTPO Panel. In a section in which a capacitor of the panel is not charged during low-frequency driving, most of display logic may be maintained in a standby mode except for generation of a panel gate control signal (for emission), such that a power supply voltage from a PMIC may fall (for example, about 1.8V to about 1.3V) to be driven, thereby reducing logic power. According to example embodiments, logic power may further be reduced in addition to existing analog power.

In a method of operating a DDI, a PMIC, and an electronic device including to the same according to example embodiments, a level of a logic voltage supplied to a display driving integrated circuit may be lowered during low-frequency driving or low-power display operation by communicating with the power management integrated circuit, thereby reducing power consumption.

At least one of the components, elements, modules or units (collectively "components" in this paragraph) represented by a block in the drawings including at least FIGS. 1, 3, 10 and 11, may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

Although the disclosure been described in connection with some embodiments illustrated in the accompanying drawings, it will be understood by one of ordinary skill in the art that variations in form and detail may be made therein without departing from the spirit and essential feature of the disclosure. The above disclosed embodiments should thus be considered illustrative and not restrictive.

What is claimed is:

1. An operating method of a display driver integrated circuit (DDI), the method comprising:

transmitting a first logic voltage power setting command to a logic circuit of the DDI to set a level of a first logic voltage supplied to the logic circuit of the DDI to a first level;

determining whether a change to a level of the first logic voltage supplied to the logic circuit of the DDI from the first level is required;

based on determining that a change to the level of the first logic voltage from the first level is required, transmitting a second logic voltage power setting command to a power management integrated circuit (PMIC); and receiving, from the PMIC, a second logic voltage having a level different from the first level of the first logic voltage and corresponding to the second logic voltage power setting command.

2. The method of claim 1, further comprising:

determining whether a change to a level of an analog voltage supplied to an analog circuit of the DDI is required; and based on determining that a change to the level of the analog voltage is required, transmitting a corresponding analog voltage setting command to the PMIC.

3. The method of claim 1, further comprising:

receiving, from an application processor, a power control command corresponding to a voltage control of the PMIC.

4. The method of claim 1, wherein the determining whether the change to the level of the first logic voltage supplied to the logic circuit of the DDI from the first level is required comprises:

determining to raise the level of the first logic voltage before a tearing effect (TE) signal is enabled, the TE signal indicating a point in time at which an image update is available.

5. The method of claim 4, wherein the determining whether the change to the level of the first logic voltage supplied to the logic circuit of the DDI from the first level is required further comprises:

determining to lower the level of the first logic voltage after the TE signal is disabled.

6. The method of claim 4, wherein the TE signal is periodically output to an application processor.

7. The method of claim 1, wherein the transmitting the second logic voltage power setting command to the PMIC comprises:

determining a time point of transmitting the second logic voltage power setting command to the PMIC based on a power stabilization time of the PMIC and a communication timing with the PMIC.

8. The method of claim 1, further comprising:

reducing a number of communications with the PMIC based on touch sensitive panel (TSP) information.

9. The method of claim 1, wherein the method further comprises maintaining the level of the first logic voltage at a second level that is lower than the first level when there is no tearing effect (TE) signal.

10. The method of claim 1, wherein the method further comprises, based on a low-power display being driven, lowering a power supply voltage of a low drop-out (LDO) regulator to a third level lower than a second level, the second level being lower than the first level.

11. A power management integrated circuit (PMIC), comprising:

a first voltage generator configured to:

generate a first voltage supplied to a panel, and determine a level of the first voltage in response to a first control signal;

a second voltage generator configured to:

generate a second voltage supplied to an analog circuit of a display driver integrated circuit (DDI), and determine a level of the second voltage in response to a second control signal;

a third voltage generator configured to:

generate a third voltage supplied to the DDI, and determine a level of the third voltage in response to a third control signal; and a logic circuit configured to:

receive at least one power setting command via communication with the DDI, and generate the first control signal, the second control signal, and the third control signal.

12. The PMIC of claim 11, wherein the PMIC is configured to communicate with the DDI via an inter-integrated circuit (I2C) interface or an S-wire interface.

13. The PMIC of claim 11, wherein the logic circuit is further configured to alternately receive, from the DDI, a first power setting command and a second power setting command, wherein the first power setting command comprises a command to raise the level of the third voltage to a first level, and wherein the second power setting command is comprises a command to lower the level of the third voltage to a second level lower than the first level.

14. The PMIC of claim 11, wherein the logic circuit is further configured to periodically or aperiodically receive the first power setting command and the second power setting command.

15. The PMIC of claim 11, wherein the logic circuit comprises a register configured to receive the at least one power setting command.

* * * * *